US005395028A

United States Patent [19]

Ishii et al.

[11] Patent Number: 5,395,028

[45] Date of Patent: Mar. 7, 1995

[54] APPARATUS FOR TRANSPORTING THIN METAL SHEETS LONGITUDINALLY WITH TRANSVERSE TENSION

[75] Inventors: Fusao Ishii, Pittsburgh; Joseph A. Marcanio, Greensburgh, both of Pa.

[73] Assignee: Sony Electronics, Inc., Park Ridge, N.J.

[21] Appl. No.: 978,335

[22] Filed: Nov. 18, 1992

[51] Int. Cl.[6] .................................... G03B 1/24

[52] U.S. Cl. .................................... 226/76; 226/82

[58] Field of Search .................... 226/76, 82, 83; 400/616.1, 616, 166.3

[56] References Cited

U.S. PATENT DOCUMENTS 3,656,602 4/1972 Konkel et al. ............... 400/616.1 X
4,026,756 5/1977 Stanfield et al. .................. 226/76 X
4,412,637 11/1983 Berger ............................. 226/76 X
4,571,104 2/1986 Jung et al. ........................ 226/76 X
4,990,010 2/1991 Mizutani .......................... 226/82 X
5,017,943 5/1991 Ogita et al. ...................... 400/616 X
5,217,317 6/1993 Ruhe et al. ....................... 400/616.1

*Primary Examiner*—Daniel P. Stodola
*Assistant Examiner*—Eileen A. Dunn
*Attorney, Agent, or Firm*—Jay H. Maioli

[57] ABSTRACT

A thin strip or flat web of metal material is transported longitudinally in a stable manner and without contact to the working surface by providing a generally constant transverse tension to the web. Equally spaced holes are punched along the outer edges of the web and two oppositely arranged sprockets engage the holes and drive the metal strip without any contact across the width of the strip. The two sprockets are slidably engaged for concurrent rotation with each other and biased outwardly by a spring to provide the constant transverse tension as the web is driven longitudinally.

7 Claims, 3 Drawing Sheets

FIG. 1
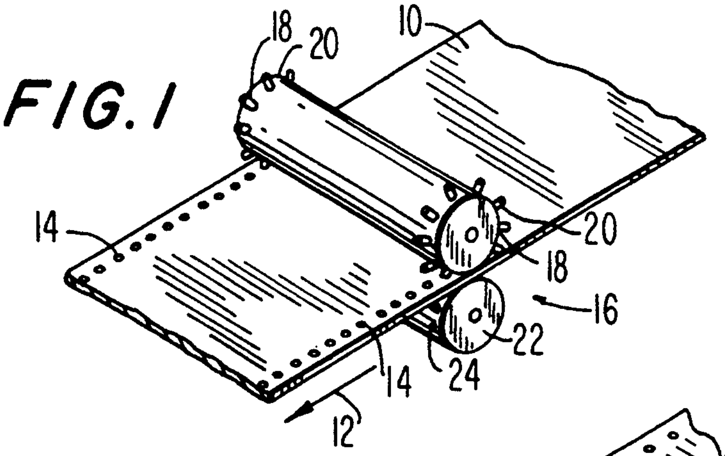
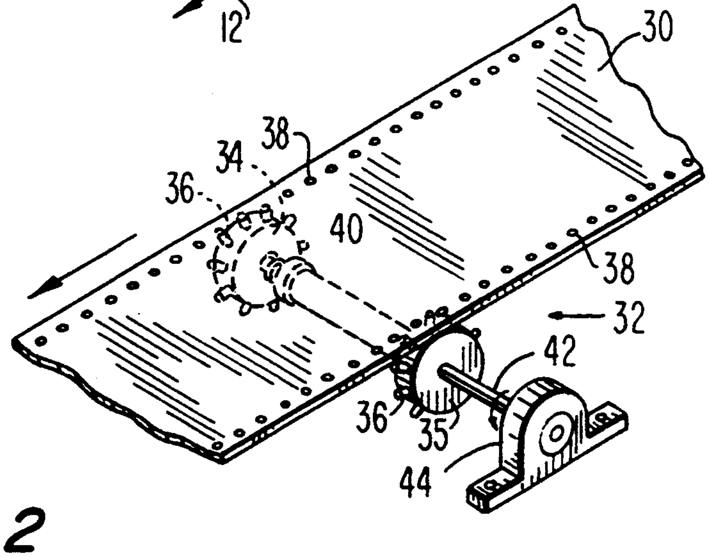
FIG. 2
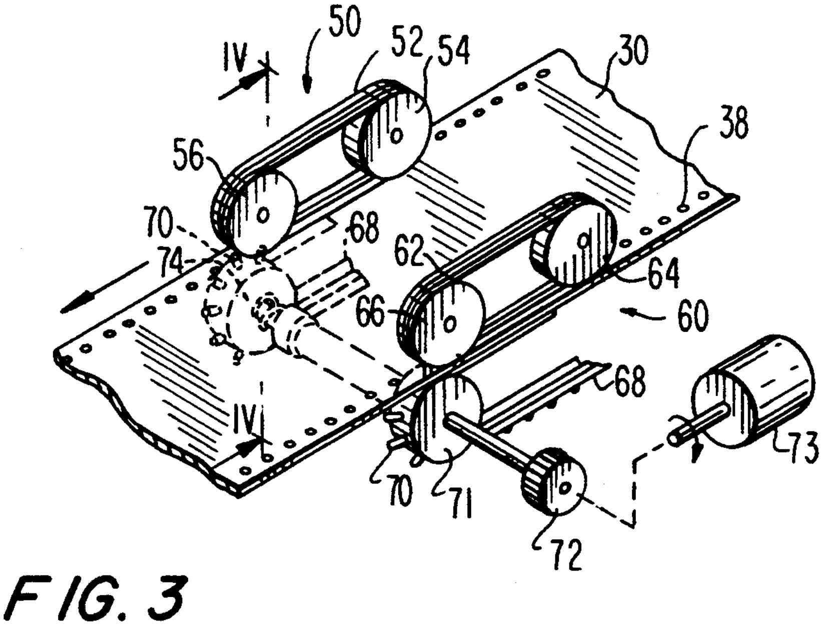
FIG. 3

APPARATUS FOR TRANSPORTING THIN METAL SHEETS LONGITUDINALLY WITH TRANSVERSE TENSION

BACKGROUND OF THE INVENTION

1. Field of the Invention

This invention relates generally to transporting a thin metal sheet or strip and, more particularly, to a method and apparatus for maintaining a transverse tension on a thin metal web without contacting the surface of the web, while at the same time the web is being transported longitudinally.

2. Description of the Background

In the production of modern color television picture tubes, an important component is the so-called shadow mask. This shadow mask causes the appropriate electron beam to fall on the proper color phosphor coated on the inner surface of the picture tube. The shadow mask is formed as a metal sheet that has a vast number of apertures formed therein, which apertures may be in the form of circular holes or slots. There is also known for use a grill mask that has a large number of closely spaced slits. Typically, a shadow mask is formed by using an etching process that involves coating a metal sheet with a photo-resist material, exposing the photo-resist material through a mask, and then etching the resultant pattern into the metal sheet. The metal sheets used for shadow masks are typically steel and are known to be made around 0.10 mm thick, although other thicknesses are available, such as 0.30 mm and thicker. The thinness of the material is generally limited by the difficulties presented in handling such thin materials.

In working with such materials it is quite difficult to prevent damage to the shadow mask as it is being operated upon to produce the desired aperture pattern. Problems are encountered with the material wrinkling and in maintaining tracking of the material when it is in the form of a continuous web. Continuous webs of this metal material are typically used in manufacturing such shadow masks, because at the end of the etching process the masks can be cut from the continuous web relatively easily. To improve the handling of this metal material it has been proposed to provide a support layer to add rigidity during transporting of the material, and such a system is disclosed in U.S. Pat. No. 4,755,257. The problem with this approach is that the support layer cannot be used indefinitely and must be periodically replaced, so that this increases the cost of the resultant shadow masks. Moreover, by using a support layer only one side of the web can be etched to form the apertures, which is not always a desirable approach in performing an etching process.

OBJECTS AND SUMMARY OF THE INVENTION

Accordingly, it is an object of the present invention to provide a method and apparatus for handling material in the form of a metal web that can eliminate the above-noted defects inherent in the prior art and that can permit shadow masks to be fabricated from very thin metal material.

Another object of this invention is to provide a method and apparatus for transporting thin metal material longitudinally while at the same time providing transverse tension on the material and not requiring surface contact across the width of the material.

A further object of this invention is to provide a method and apparatus for transporting a thin metal sheet or a thin metal web with transverse tension by punching a series of small holes along each edge of the web and then transporting the web using these holes and a tractor assembly having two sprocket wheels, in which the transverse tensioning force is applied to at least one of the two sprocket wheels of the tractor assembly while the perforated material is being longitudinally driven.

In accordance with an aspect of the present invention, when transporting an ultra-thin metal web, holes are punched along each outboard edge and then a tractor assembly having sprocket wheels is provided to drive the web using the holes. The proper engaging force or bite force may be obtained by using a back-up roller above each sprocket wheel of the tractor assembly, with the back-up roller having suitable clearance so that the sprocket teeth do not contact the back-up roller. A suitable bite force may also be obtained by employing a back-up belt mounted on a grooved roller with the belt being formed of a polymeric material.

The transverse tension exerted on the thin, metal web can be applied by one or both of the two sprockets of the tractor assembly by using a sliding spline biased by a spring or by using a pneumatic arrangement or similar mechanism to provide an outwardly directed bias force substantially perpendicular to the direction of travel of the web.

The above and other objects, features, and advantages of the present invention will become apparent from the following detailed description of illustrative embodiments thereof, to be read in connection with the accompanying drawings in which like reference numerals represent the same or similar elements.

BRIEF DESCRIPTION OF THE DRAWINGS

FIG. 1 is a perspective of a punch assembly for punching holes in the edges of the web according to the present invention;

FIG. 2 is a perspective showing a web passing over tractor sprockets in which transverse tension is provided to one of the tractor sprockets according to an embodiment of the present invention;

FIG. 3 is a perspective view of a web being transported by a tractor assembly and having a back-up belt arrangement for providing proper engagement force between the metal web and the sprockets according to an embodiment of the present invention;

DETAILED DESCRIPTION OF PREFERRED EMBODIMENTS

Figure 4:
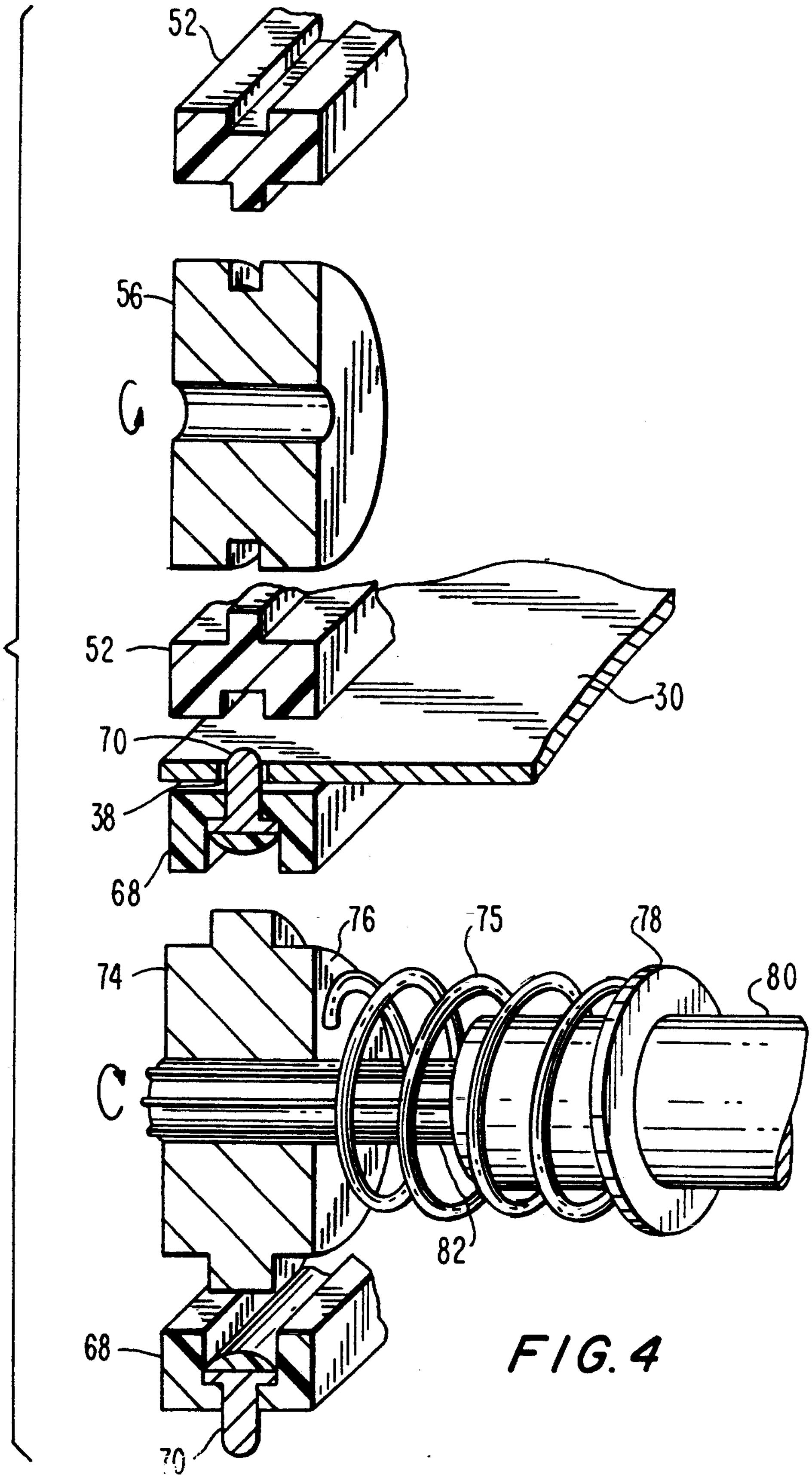
FIG. 4 is an exploded view in cross-section taken along section lines IV—IV in FIG. 3.

In order to take advantage of the feature of the present invention relating to providing transverse tension while driving a web longitudinally, a series of equally spaced holes are punched along each outer edge of the continuous metal strip. FIG. 1 shows one embodiment for providing those holes or perforations along the continuous outer edges of the sheet. More specifically, a thin metal web 10 is driven longitudinally in a direction shown by arrow 12 and as it is being driven, a series of equally spaced perforations, shown typically 14, are punched therein by a punch and die roller assembly, shown generally at 16. The punch and die roller assembly 16 consists of a punch roller 18 having sharp, extending, punch elements 20 arranged on an upper surface of the web 10 and a complementary die roller 22 that is located on the opposite side of web 10 and aligned with the punch roller 18. A series of sharply formed holes 24 comprise the die and are complementary to the extending punch elements 20 on the punch roller 18. Accordingly, by passing the thin metal web 10 through the nip of the punch and die roller assembly 16, the punch and die roller assembly 16 rotates and equally spaced perforations are formed along the edges of the strip.

Having provided the perforations along the edges of the metal web 10, the metal web 10 is then ready to be used for forming a shadow mask for a color television picture tube, for example. As noted above, there are several manufacturing steps that are practiced in order to provide the perforated shadow mask and the present invention contemplates the provision of the special transport rollers that provide transverse tension located at each of the several different operating positions of the manufacturing process.

After the holes are punched along each edge of the web there may be a small burr formed around each hole. These can be removed by etching. When the photoresist is applied to the web in which the perforations have been punched there is the possibility that the photoresist will fill the small holes. Thus, this could be alleviated by masking the perforations during the coating of the photoresist. This means, however, that during the etching process the holes must be masked also, otherwise the edges of the web will be etched away. As can be seen, there are numerous problems associated with handling and working such extremely thin metal material.

In order to show the operation of the present invention, the duly perforated continuous metal web 30 is shown in FIG. 2 being driven by a tractor or sprocket assembly, shown generally at 32. The tractor assembly 32 consists of two sprocket wheels 34, 35 each having equally spaced teeth or pins 36 that cooperate with the corresponding perforations 38 formed in the continuous metal web 30. The continuous metal web 30 is shown in FIG. 2 as being transparent in order to show the transverse tension assembly provided by the present invention. However, it is understood in practice that the continuous metal web is black and opaque. In the tractor assembly 32, the tension is provided by a transverse tension assembly 40 that is shown in more detail in FIGS. 4 and 5 and that will be explained in detail hereinbelow. In this embodiment the transverse tension arrangement 40 is provided on just one of the two sprocket wheels 34, 35 and involves a sliding spline and a compression spring to bias the movable sprocket wheel 34 outwardly or away from the fixed sprocket wheel 35 of the drive sprocket assembly 32. Although the drive sprocket assembly 32 is intended to be driven, it could also be an idler with the shaft 42 held in a pillow block 44, for example.

In operating the transverse tensioning system shown in FIG. 2, the continuous metal web is so thin that it is easily subject to fluctuations. Thus, in some instances it is preferable to provide a backing roller or backing belt to make certain that the edges of the continuous web are seated on the sprocket wheels as they drive the web.

One such arrangement for a back-up belt is shown in FIG. 3 in Which two separate back-up belt assemblies 50 and 60 are provided. Back-up belt assembly 50 consists of a backing belt 52 and at least two idler rollers 54 and 56 that are positioned in contact with one edge of the continuous web, and back-up belt assembly 60 consists of a backing belt 62 and at least two idler rollers 64 and 66 positioned at the other edge of the continuous web. The two assemblies 50 and 60 are respectively positioned so that they are exactly opposite the location where the teeth of the drive rollers engage the holes 38 of the perforated sheet 30. In the embodiment of FIG. 2 such teeth are shown typically at 36, however, the sprocket wheels 34, 35 in the embodiment of FIG. 2 are replaced by drive belts 68 that drive pins 70 extending from it. This arrangement is shown in more detail in FIG. 4, which is an exploded cross-sectional view taken through section lines IV—IV of FIG. 3.

As shown in FIGS. 3 and 4, the perforated continuous web 30 is stretched between the two drive belts 68 that have a number of individual, metal drive pins 70 extending outwardly to engage the perforations 38 in the web 30. One drive belt 68 is mounted by a drive roller 71 that is connected by a shaft and gear assembly 72 to a drive motor 73. The other drive belt 68 is mounted by a drive roller 74 shown in more detail in FIG. 4. Each pin 70 that extends through one of the perforations 38 in the web 30 is backed up by a backing belt 52, 62 that is formed with a circumferential groove that is aligned with the series of perforations 38 formed in the sheet 30. The backing belts 52 and 62 ride on a respective back-up roller assembly 54, 56 and 64, 66 that are mounted for rotation. The backing belt assemblies 50 and 60 need not be driven and the rollers 54, 56 and 64, 66 may be simply idler rollers. All that is required is that the belt 62 be arranged in contact with the perforated metal sheet 30 opposite the pins or teeth 70. Rollers 54 and 56 of the back-up assembly 50 can be arranged to slide on their respective shafts, so that the assembly 50 can follow any movement of the transverse tensioning assembly described below.

As shown in FIG. 4 the transverse tensioning force is provided by biasing the web drive roller 74 toward the outside or away from the other drive sprocket. This force is provided by a compression spring 75 that abuts the inner side 76 of drive roller 74 at its one end and at its other end abuts a stop collar 78 that is affixed to the shaft 80 that is connected to the other, non-biased drive roller 71. The transverse force is provided by using a splined shaft 82 that slides in corresponding channels in shaft 80. This permits drive roller 74 to be moved toward and away from stop collar 78, which is affixed to the drive shaft 80, which is affixed to the other drive roller 71. In this way, a constant tension is transversely provided on the perforated web 30 by the spring force of compression spring 75.

In place of the back-up roller and back-up belt assemblies 50 and 60 that cooperate with the drive belt 68 and drive roller assemblies 71, 74 shown in FIGS. 3 and 4, a back-up roller may be provided that has a clearance to accommodate the pins or teeth of a sprocket wheel, such as that shown in the embodiment of FIG. 2, for example.

Figure 5:
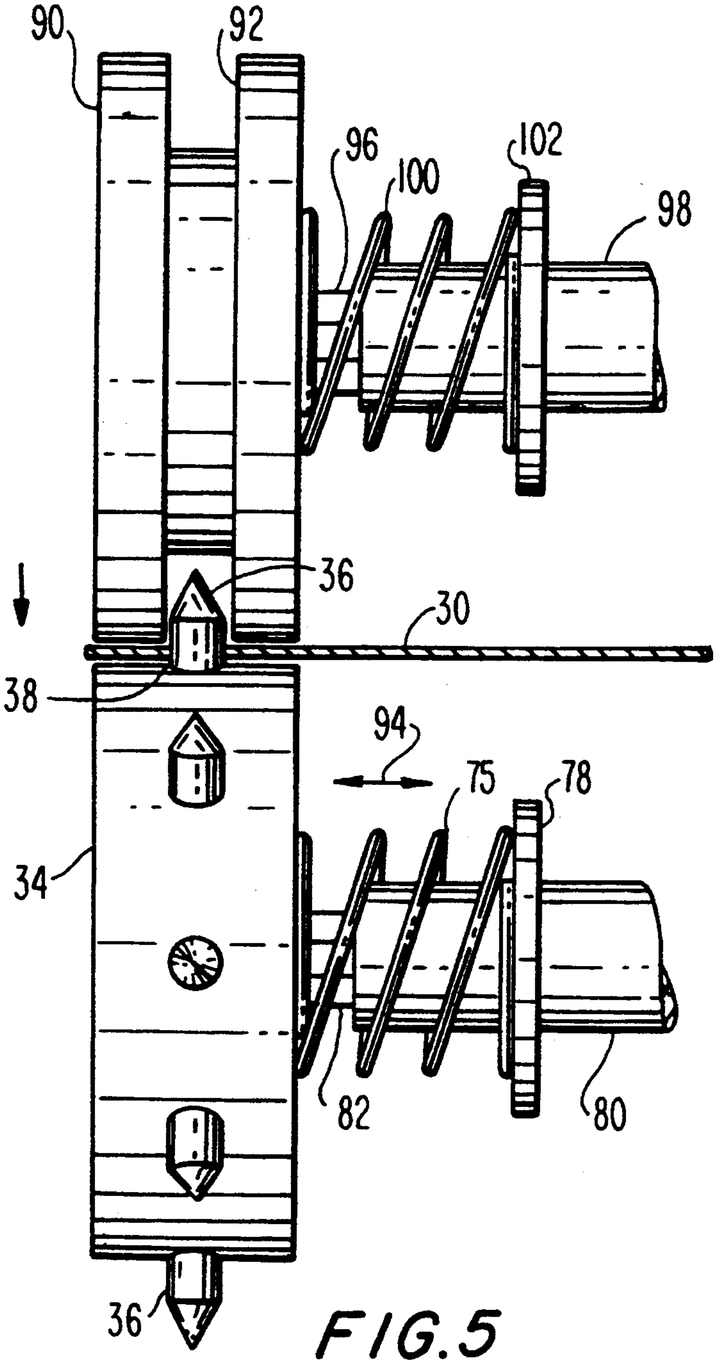
FIG. 5 is an elevational view in cross-section showing an engagement between the metal web and the transporting sprocket and showing an arrangement for providing a transverse force according to an embodiment of the present invention.

FIG. 5 shows a back-up roller 90 that has a circumferential clearance channel 92 formed therein to accommodate the pins 36 of the sprocket wheel 34. Of course, roller 90 and channel 92 could also accommodate pins 70 on drive belt 68. The splined shaft 82 is shown in the elevational view of FIG. 5 and the freedom of motion for spline 82 and sprocket wheel 34 to slide in and out of shaft 80 is represented by arrow 94. Because it is desirable to have the back-up roller maintain alignment with the sprocket, a similar transverse tensioning arrangement can be provided for back-up roller 90. Once again, a spline 96 slides in a channeled shaft 98 and the tensioning force is provided by a compression spring 100 that abuts, at one end, a stop collar 102 affixed to shaft 98 and, at the other end, an inner, flat surface 104 of back-up roller 90.

Although a second transverse tensioning arrangement is shown for the back-up roller 90 in FIG. 5, back-up roller 90 can also be a floating idler roller that rides on the edge of the perforated web 30 guided by the pins 36 of sprocket 34. Similarly, although the roller 71 and belt 68 assembly is shown as being driven, such assembly need not be driven and can simply be an idler arrangement and the perforated web can be driven by some other sprocket or drive arrangement ahead of the overall transverse tensioning device.

Therefore, as seen from the above, it is possible to longitudinally move a thin metal web without contacting the web except at the very edges thereof by providing a transverse tension force to maintain the extremely thin web in alignment and in a generally planar state.

Although the transverse tensioning force has been shown being applied with a movable sprocket and spring arrangement, such force could also be provided by setting the distance between the drive sprockets to a very slight distance larger than the distance between the perforations. This involves adherence to close tolerances but in view of the tensile strength of the steel web does present an alternative to the movable sprocket approach.

Having described preferred embodiments with reference to the accompanying drawings, it is to be understood that the invention is not limited to those precise embodiments and that various changes and modifications could be effected by one skilled in the art without departing from the spirit or scope of the novel concepts of the invention, as defined in the appended claims.

What is claimed is:

1. An apparatus for providing transverse tension on a web of thin, flat material having periodic perforations formed along longitudinal edges thereof, comprising:

first tractor means arranged adjacent to one flat surface of the web and having first engaging means engaging the perforations formed along one longitudinal edge of the web;

second tractor means arranged adjacent to said one flat surface of the web and having second engaging means engaging the perforations along another longitudinal edge of the web;

means for slidably coupling said first and second tractor means for mutual concurrent rotation and for permitting mutual displacement therebetween relative to a width of the web; and biasing means for urging said first tractor means away from said second tractor means relative to the width of the web.

2. The apparatus according to claim 1, wherein said first and second tractor means comprise respective drive rollers and drive belts and wherein said first and second engaging means comprise teeth protruding from said respective drive belts and engaging said perforations of said web.

3. The apparatus according to claim 2 wherein said means for slidably coupling comprises a splined shaft connected to said second tractor means and an internally channelled shaft slidably receiving said splined shaft at one end and affixed at another end to said first tractor means.

4. The apparatus according to claim 3, wherein said biasing means comprises a compression spring arranged between said second tractor means and said internally channelled shaft of said means for slidably coupling.

5. The apparatus according to claim 4, further comprising a stop collar affixed around a periphery of said internally channelled shaft and having one end of said compression spring abutting thereagainst and another end of said compression spring abutting against said second tractor means.

6. The apparatus according to claim 2, further comprising first and second back-up assemblies arranged adjacent to another flat surface of the web opposite said one flat surface and being respectively aligned opposite said teeth of said first and second tractor means engaging said perforations of said web.

7. The apparatus according to claim 6, wherein said first and second back-up assemblies include respective first and second back-up rollers arranged for rotation and first and second back-up belts operably engaging said first and second back-up rollers, respectively, wherein said back-up belts each include a central groove formed therein for respectively receiving said teeth of said first and second tractor means engaging said perforations of the web.

* * * * *